(12) United States Patent
Rached (10) Patent No.: US 10,808,157 B2
(45) Date of Patent: Oct. 20, 2020

(54) VEHICLE HEATING AND/OR AIR CONDITIONING METHOD

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/809,164

(22) Filed: Nov. 10, 2017

(65) Prior Publication Data

US 2018/0086173 A1    Mar. 29, 2018

Related U.S. Application Data

(63) Continuation of application No. 15/368,347, filed on Dec. 2, 2016, which is a continuation of application No. 13/127,144, filed as application No. PCT/FR2009/052075 on Oct. 28, 2009, now abandoned.

(30) Foreign Application Priority Data

Nov. 3, 2008 (FR) ...................................... 08 57454

(51) Int. Cl.
*C09K 5/04* (2006.01)
*B60H 1/00* (2006.01)

(52) U.S. Cl.
CPC ......... *C09K 5/045* (2013.01); *B60H 1/00907* (2013.01); *C09K 2205/126* (2013.01)

(58) Field of Classification Search
CPC .... B60H 1/00278; B60H 1/004; B60H 1/143; B60H 1/00314; F25B 13/00; H01M 10/60; H01M 10/61; H01M 10/615
See application file for complete search history.

(56) References Cited

U.S. PATENT DOCUMENTS

| | | | |
|---|---|---|---|
| 3,240,825 A | 3/1966 | Hauntschein et al. |
| 4,978,062 A | 12/1990 | Lange, Sr. |
| 5,251,459 A | 10/1993 | Grass et al. |
| 5,404,729 A | 4/1995 | Matsuoka et al. |
| 5,490,572 A | 2/1996 | Tajiri et al. |

(Continued)

FOREIGN PATENT DOCUMENTS

| | | |
|---|---|---|
| EP | 1 108 575 A1 | 6/2001 |
| EP | 1 108 575 A4 | 6/2001 |

(Continued)

OTHER PUBLICATIONS

U.S. Appl. No. 13/128,996, Wissam Rached, filed May 12, 2011, (Cited herein as US Patent Application No. 2011/0219791 A1 dated Sep. 15, 2011).

(Continued)

*Primary Examiner* — Cassey D Bauer
(74) *Attorney, Agent, or Firm* — Buchanan Ingersoll & Rooney P.C.

(57) ABSTRACT

A method for the heating and/or air conditioning of the passenger compartment of an automobile using a reversible cooling loop in which flows a coolant containing 2,3,3,3-tetrafluoropropene. The method is particularly useful when outdoor temperature is lower than −15° C. The method can be used for hybrid automobiles designed for operating alternatively with a thermal engine and an electric motor.

23 Claims, 6 Drawing Sheets

(56) References Cited

U.S. PATENT DOCUMENTS

| | | | |
|---|---|---|---|
| 5,871,041 A | 2/1999 | Rafalovich et al. | |
| 6,077,158 A * | 6/2000 | Lake | B60H 1/00278 |
| | | | 454/70 |
| 6,237,681 B1 | 5/2001 | Takano et al. | |
| 6,327,866 B1 | 12/2001 | Novak et al. | |
| 6,881,354 B2 | 4/2005 | Arman et al. | |
| 7,084,315 B2 | 8/2006 | Corr et al. | |
| 7,279,451 B2 | 10/2007 | Singh et al. | |
| 7,534,366 B2 | 5/2009 | Singh et al. | |
| 8,070,977 B2 | 12/2011 | Rached | |
| 8,075,798 B2 | 12/2011 | Rached | |
| 8,246,850 B2 | 8/2012 | Rached | |
| 8,252,198 B2 | 8/2012 | Rached | |
| 8,557,135 B2 | 10/2013 | Rached | |
| 8,808,569 B2 | 8/2014 | Rached | |
| 8,858,824 B2 | 10/2014 | Boussand | |
| 8,858,825 B2 | 10/2014 | Guerin et al. | |
| 9,011,711 B2 | 4/2015 | Rached | |
| 9,028,706 B2 | 5/2015 | Rached et al. | |
| 9,039,922 B2 | 5/2015 | Rached | |
| 9,127,191 B2 | 9/2015 | Rached | |
| 9,133,379 B2 | 9/2015 | Rached | |
| 9,175,203 B2 | 11/2015 | Rached | |
| 9,267,064 B2 | 2/2016 | Rached | |
| 9,315,708 B2 | 4/2016 | Guerin et al. | |
| 9,399,726 B2 | 7/2016 | Rached | |
| 9,505,968 B2 | 11/2016 | Rached | |
| 9,512,343 B2 | 12/2016 | Rached et al. | |
| 9,599,381 B2 | 3/2017 | Rached | |
| 9,650,551 B2 | 5/2017 | Collier et al. | |
| 9,650,553 B2 | 5/2017 | Deur-Bert et al. | |
| 9,663,697 B2 | 5/2017 | Rached | |
| 9,676,984 B2 | 6/2017 | Guerin et al. | |
| 9,683,155 B2 | 6/2017 | Deur-Bert et al. | |
| 9,683,157 B2 | 6/2017 | Rached | |
| 9,884,984 B2 | 2/2018 | Rached | |
| 9,908,828 B2 | 3/2018 | Rached et al. | |
| 9,969,918 B2 | 5/2018 | Deur-Bert et al. | |
| 10,023,780 B2 | 7/2018 | Guerin et al. | |
| 10,035,938 B2 | 7/2018 | Rached | |
| 10,119,055 B2 | 11/2018 | Boussand | |
| 10,125,296 B2 | 11/2018 | Rached | |
| 10,131,829 B2 | 11/2018 | Deur-Bert et al. | |
| 10,252,913 B2 | 4/2019 | Bonnet et al. | |
| 10,316,231 B2 | 6/2019 | Rached | |
| 10,358,592 B2 | 7/2019 | Rached | |
| 10,377,935 B2 | 8/2019 | Guerin et al. | |
| 10,399,918 B2 | 9/2019 | Rached | |
| 10,450,488 B2 | 10/2019 | Boussand | |
| 10,604,690 B2 | 3/2020 | Collier et al. | |
| 10,618,861 B2 | 4/2020 | Rached | |
| 2001/0013409 A1 * | 8/2001 | Burk | B60H 1/025 |
| | | | 165/240 |
| 2003/0037562 A1 | 2/2003 | Honda et al. | |
| 2003/0209026 A1 | 11/2003 | Sakuma | |
| 2004/0050089 A1 | 3/2004 | Amaral | |
| 2004/0104020 A1 | 6/2004 | Haller et al. | |
| 2004/0200610 A1 * | 10/2004 | Hara | B60H 1/00314 |
| | | | 165/202 |
| 2005/0103465 A1 | 5/2005 | Brasz | |
| 2005/0103487 A1 | 5/2005 | Aflekt et al. | |
| 2005/0133215 A1 | 6/2005 | Ziehr et al. | |
| 2005/0245421 A1 | 11/2005 | Singh et al. | |
| 2005/0258394 A1 | 11/2005 | Bacher et al. | |
| 2006/0000224 A1 | 1/2006 | Matsuoka | |
| 2006/0023480 A1 | 2/2006 | Plummer | |
| 2006/0060340 A1 * | 3/2006 | Busse | B60H 1/00278 |
| | | | 165/202 |
| 2006/0168991 A1 | 8/2006 | Harm | |
| 2006/0243944 A1 | 11/2006 | Minor et al. | |
| 2007/0245737 A1 * | 10/2007 | Inaba | B60H 1/00885 |
| | | | 60/670 |
| 2008/0011110 A1 | 1/2008 | Costonis | |
| 2008/0216501 A1 | 9/2008 | Inaba et al. | |
| 2009/0288801 A1 | 11/2009 | Figus | |
| 2009/0305124 A1 | 12/2009 | Ahn et al. | |
| 2009/0314015 A1 | 12/2009 | Minor et al. | |
| 2011/0041547 A1 | 2/2011 | Komatsu | |
| 2011/0084228 A1 | 4/2011 | Rached | |
| 2011/0095224 A1 | 4/2011 | Rached | |
| 2011/0186772 A1 | 8/2011 | Rached | |
| 2011/0219791 A1 | 9/2011 | Rached | |
| 2011/0219792 A1 | 9/2011 | Rached | |
| 2011/0240254 A1 | 10/2011 | Rached | |
| 2011/0284181 A1 | 11/2011 | Rached | |
| 2012/0037352 A1 | 2/2012 | Osaka et al. | |
| 2012/0049104 A1 | 3/2012 | Rached | |
| 2012/0056123 A1 | 3/2012 | Rached | |
| 2012/0068105 A1 | 3/2012 | Rached et al. | |
| 2012/0144857 A1 | 6/2012 | Rached | |
| 2012/0151958 A1 | 6/2012 | Rached | |
| 2012/0151959 A1 | 6/2012 | Rached | |
| 2012/0153213 A1 | 6/2012 | Rached | |
| 2012/0159982 A1 | 6/2012 | Rached | |
| 2012/0161064 A1 | 6/2012 | Rached | |
| 2012/0167615 A1 | 7/2012 | Rached | |
| 2012/0205574 A1 | 8/2012 | Rached et al. | |
| 2013/0092869 A1 | 4/2013 | Boussand | |
| 2013/0105724 A1 | 5/2013 | Boussand | |
| 2013/0186114 A1 | 7/2013 | Guerin et al. | |
| 2014/0008565 A1 | 1/2014 | Rached et al. | |
| 2014/0075969 A1 | 3/2014 | Guerin et al. | |
| 2014/0318160 A1 | 10/2014 | Rached | |
| 2014/0326017 A1 | 11/2014 | Rached | |
| 2015/0027146 A1 | 1/2015 | Boussand | |
| 2015/0152306 A1 | 6/2015 | Rached | |
| 2015/0152307 A1 | 6/2015 | Rached | |
| 2015/0322317 A1 | 11/2015 | Collier et al. | |
| 2015/0322321 A1 | 11/2015 | Deur-Bert et al. | |
| 2015/0344761 A1 | 12/2015 | Rached | |
| 2015/0353799 A1 | 12/2015 | Deur-Bert et al. | |
| 2015/0353802 A1 | 12/2015 | Rached | |
| 2016/0009555 A1 | 1/2016 | Bonnet et al. | |
| 2016/0024363 A1 | 1/2016 | Rached | |
| 2016/0025394 A1 | 1/2016 | Rached | |
| 2016/0115361 A1 | 4/2016 | Boussand | |
| 2016/0122609 A1 | 5/2016 | Rached | |
| 2016/0194541 A1 | 7/2016 | Guerin et al. | |
| 2016/0244652 A1 | 8/2016 | Rached | |
| 2016/0272561 A1 | 9/2016 | Rached et al. | |
| 2016/0298014 A1 | 10/2016 | Rached | |
| 2016/0355718 A1 | 12/2016 | Rached | |
| 2016/0376484 A1 | 12/2016 | Guerin et al. | |
| 2017/0037291 A1 | 2/2017 | Rached et al. | |
| 2017/0080773 A1 | 3/2017 | Rached | |
| 2017/0145276 A1 | 5/2017 | Rached | |
| 2017/0210960 A1 | 7/2017 | Deur-Bert et al. | |
| 2017/0210962 A1 | 7/2017 | Collier et al. | |
| 2017/0218241 A1 | 8/2017 | Deur-Bert et al. | |
| 2017/0218242 A1 | 8/2017 | Rached | |
| 2018/0086173 A1 | 3/2018 | Rached | |
| 2018/0134936 A1 | 5/2018 | Rached | |
| 2018/0148395 A1 | 5/2018 | Rached et al. | |
| 2018/0244970 A1 | 8/2018 | Rached | |
| 2018/0282603 A1 | 10/2018 | Guerin | |
| 2018/0327645 A1 | 11/2018 | Boussand | |
| 2019/0023957 A1 | 1/2019 | Rached | |
| 2019/0048518 A1 | 2/2019 | Wong et al. | |
| 2019/0203094 A1 | 7/2019 | Rached | |
| 2019/0249057 A1 | 8/2019 | Rached | |
| 2019/0284500 A1 | 9/2019 | Rached | |
| 2019/0337874 A1 | 11/2019 | Rached et al. | |
| 2019/0359870 A1 | 11/2019 | Rached | |
| 2019/0367789 A1 | 12/2019 | Rached | |
| 2020/0048518 A1 | 2/2020 | Rached | |
| 2020/0216734 A1 | 7/2020 | Rached | |

FOREIGN PATENT DOCUMENTS

| | | |
|---|---|---|
| EP | 1 302 731 A1 | 4/2003 |
| EP | 1 329 344 A1 | 7/2003 |
| EP | 1 598 406 A1 | 11/2005 |
| EP | 1 621 389 A2 | 2/2006 |

(56) References Cited

FOREIGN PATENT DOCUMENTS

| | | |
|---|---|---|
| EP | 1 329 344 B1 | 2/2008 |
| EP | 1 961 596 A2 | 8/2008 |
| EP | 1 961 596 A3 | 8/2008 |
| FR | 2 847 973 A1 | 6/2004 |
| FR | 2 905 633 A1 | 3/2008 |
| FR | 2 905 633 B1 | 3/2008 |
| JP | H04-110388 | 4/1992 |
| JP | H10-166847 A | 6/1998 |
| JP | 2000-062446 A | 2/2000 |
| JP | 2000-142094 A | 5/2000 |
| JP | 2003-326960 A | 11/2003 |
| JP | 2004-322933 A | 11/2004 |
| JP | 2007-538115 A | 12/2007 |
| JP | 2008-044562 A | 2/2008 |
| JP | 2008-531836 A | 8/2008 |
| RU | 2 073 058 C1 | 2/1997 |
| WO | WO 01/87653 A1 | 11/2001 |
| WO | WO 03/095250 A1 | 11/2003 |
| WO | WO 2005/103190 A1 | 11/2005 |
| WO | WO 2005/108522 A1 | 11/2005 |
| WO | WO 2006/094303 A2 | 9/2006 |
| WO | WO 2006/094303 A3 | 9/2006 |
| WO | WO 2007/002625 A2 | 1/2007 |
| WO | WO 2007/042621 A1 | 4/2007 |
| WO | WO 2007/114615 A1 | 10/2007 |
| WO | WO 2007/144632 A1 | 12/2007 |
| WO | WO 2008/001004 A1 | 1/2008 |
| WO | WO 2008/006866 A1 | 1/2008 |
| WO | WO 2008/027555 A2 | 3/2008 |
| WO | WO 2008/027555 A3 | 3/2008 |
| WO | WO 2008/107623 A2 | 9/2008 |
| WO | WO 2008/107623 A3 | 9/2008 |
| WO | WO 2009/114398 A1 | 9/2009 |
| WO | WO 2009/133859 A1 | 11/2009 |

OTHER PUBLICATIONS

U.S. Appl. No. 13/146,721, Wissam Rached, filed Jul. 28, 2011, (Cited herein as US Patent Application No. 2011/0284181 A1 dated Nov. 24, 2011).
U.S. Appl. No. 13/808,326, Béatrice Boussand, filed Jan. 4, 2013, (Cited herein as US Patent Application Publication No. 2013/0105724 A1 dated May 2, 2013).
U.S. Appl. No. 14/371,118, Béatrice Boussand, filed Jul. 8, 2014, (Cited herein as US Patent Application Publication No. 2015/0027146 A1 dated Jan. 29, 2015).
U.S. Appl. No. 14/615,780, Wissam Rached, filed Feb. 6, 2015, (Cited herein as US Patent Application Publication No. 2015/0152307 A1 dated Jun. 4, 2015).
U.S. Appl. No. 14/772,950, Philippe Bonnet, filed Sep. 4, 2015, (Cited herein as US Patent Application Publication No. 2016/0009555 A1 dated Jan. 14, 2016).
U.S. Appl. No. 14/990,159, Béatrice Boussand, filed Jan. 7, 2016, (Cited herein as US Patent Application Publication No. 2016/0115361 A1 dated Apr. 28, 2016).
U.S. Appl. No. 15/297,569, Wissam Rached, filed Oct. 19, 2016, (Cited herein as US Patent Application Publication No. 2017/0037291 A1 dated Feb. 9, 2017).
U.S. Appl. No. 15/368,347, Wissam Rached, filed Dec. 2, 2016, (Cited herein as US Patent Application Publication No. 2017/0080773 A1 dated Mar. 23, 2017).
U.S. Appl. No. 15/396,855, Wissam Rached, filed Jan. 3, 2017, (Cited herein as US Patent Application Publication No. 2017/0145276 A1 dated May 25, 2017).
U.S. Appl. No. 15/481,815, Bertrand Collier, filed Apr. 7, 2017, (Cited herein as US Patent Application Publication No. 2017/0210962 A1 dated Jul. 27, 2017).
U.S. Appl. No. 15/490,541, Dominique Deur-Bert, filed Apr. 18, 2017, (Cited herein as US Patent Application Publication No. 2017/0218241 A1 dated Aug. 3, 2017).
U.S. Appl. No. 15/491,717, Wissam Rached, filed Apr. 19, 2017, (Cited herein as US Patent Application Publication No. 2017/0218242 A1 dated Aug. 3, 2017).
U.S. Appl. No. 15/856,703, Wissam Rached, filed Dec. 28, 2017, (Cited herein as US Patent Application Publication No. 2018/0134936 A1 dated May 17, 2018).
U.S. Appl. No. 15/878,794, Wissam Rached, filed Jan. 24, 2018, (Cited herein as US Patent Application Publication No. 2018/0148395 A1 dated May 31, 2018).
U.S. Appl. No. 15/820,996, Wissam Rached, filed Nov. 22, 2017, (Cited herein as US Patent Application Publication No. 2018/0244970 A1 dated Aug. 30, 2018).
U.S. Appl. No. 15/997,077, Sophie Guerin, Jun. 4, 2018.
U.S. Appl. No. 16/034,539, Béatrice Boussand, filed Jul. 13, 2018.
U.S. Appl. No. 15/997,077, Guerin, et al.
U.S. Appl. No. 16/034,539, Boussand.
International Search Report issued in PCT/FR2009/052075, dated Mar. 2, 2010, European Patent Office, Rijswijk, NL, 6 pages.
Official Action dated Mar. 29, 2016 in Japanese Patent Application No. 2015-087182, Japan Patent Office,3 pages; English-language machine translation—3 pages.
Third Party Observations (Observations pursuant to Article 115 EPC) dated Aug. 13, 2015 by the European Patent Office in European Patent Application EP 09 760 545.5 (Arkema France), pp. 1-6.
Essence of Reasons of Opposition, Communication from JP Agent of Jul. 19, 2018, re opposition in corresponding JP Patent Application No. 2015-87182; 2 pages.
Notice of Opposition in EP 2 342 302, dated Feb. 2, 2018 (filed Jan. 26, 2018), EPO, Munich, DE, 68 pages.
Notice of Further Opposition in EP 2 342 302, dated Feb. 12, 2018, EPO, Munich, DE, 4 pages.
Reply of Jun. 11, 2018 to Opposition EP 2 342 302; Document Annex, 20 pages.
2006 Ashrae Handbook Refrigeration, Inch-Pound Edition, Chapter 6,"Control of Moisture and other Contaminants in Refrigerant Systems," American Society of Heating, Refrigerating and Air-Conditioning Engineers, Inc., Atlanta, GA, 7 pages; http://www.ashrae.org.
Directive 2006/40/EC of The European Parliament and of the Council of May 17, 2006 relating to emissions from air-conditioning systems in motor vehicles and amending Council Directive 70/156/EEC, Official Journal of the European Union, Jun. 14, 2006, 7 pages.
Minor, Barbara, et al., "HFO-1234yf Low GWP Refrigerant Update," Purdue e-Pubs, Purdue University School of Mechanical Engineering, *International Refrigeration and Air Conditioning Conference*, Paper 937, 2008, 9 pages; http://docs.lib.purdue.edu/iracc/937.
Papadimitriou, Vassileios C., et al., "$CF_3CF=CH_2$ and $(Z)-CF_3CF=CHF$: temperature dependent OH rate coefficients and global warming potentials," *Physical Chemistry Chemical Physics* 2008, pp. 808-820, vol. 10, the Owner Societies, Royal Society of Chemistry, UK.
Pommé, Vincent, "Reversible Heat Pump System for an Electrical Vehicle" VALEO Thermal System, 1997, Society of Automotive Engineers, Inc., United States, 6 pages.
SAE International, Extract page providing publication date of Pommé, *Reversible Heat Pump System, for an Electrical Vehicle*, retrieved Jan. 18, 2018, 1 page.
Serenity GT Series, "Two-Stage, R-410a Packaged Horizontal & Vertical Unit Specifications Catalog," GeoComfort Geothermal Systems, GTSeries Catalog—Oct. 8, 2008D, 4 pages, Greenville, IL, USA.
Spatz, Mark and Minor, Barbara., HFO-1234yf Low GWP Refrigerant Update, Honeywell/DuPont Joint Collaboration, *International Refrigeration and Air Conditioning Conference at Purdue*, Jul. 14-17, 2008, Presentation Extract, Title age and p. 4.
Spatz, Mark and Minor, Barbara., HFO-1234yf Low GWP Refrigerant Update, Honeywell/DuPont Joint Collaboration, *International Refrigeration and Air Conditioning Conference at Purdue*, Jul. 14-17, 2008, Presentation Extract, 6 pages.
Spatz, Mark and Minor, Barbara, "HFO-1234yf Low GWP Refrigerant: A Global Sustainable Solution for Mobile Air Conditioning,"

(56) References Cited

OTHER PUBLICATIONS

Honeywell / DuPont Joint Collaboration, *SAE 2008 Alternate Refrigerant Systems Symposium*, Jun. 10-12, 2008, Scottsdale, AZ, Presentation Extract, 8 pages.
Spatz, Mark and Minor, Barbara, HFO-1234yf Low Gwp Refrigerant: A Global Sustainable Solution for Mobile Air Conditioning, Honeywell / DuPont Joint Collaboration, *SAE 2008 Alternate Refrigeration Systems Symposium*, Jun. 10-12, 2008, Scottsdale, AZ, 26 pages.
Thermostatic Expansion Valves, Sporlan, Bulletin 10-9, Oct. 1995, 18 pages.
Case Decision—Case No. T 1903/14 (Drying of R-1234yf/ MEXICHEM) dated Mar. 15, 2017, 7 pages; https://www.epo.org/law-practice/case-law-appeals/recent/t141903eu1.html.
**Guerin, Sophie, et al., U.S. Appl. No. 15/997,077 entitled "2,3,3,3-Tetrafluoropropene Compositions Having Improved Miscibility," filed in the U.S. Patent and Trademark Office dated Jun. 4, 2018.
**Boussand, Beatrice, U.S. Appl. No. 16/034,539 entitled "Stable 2,3,3,3-Tetrafluoropropene Composition," filed in the U.S. Patent and Trademark Office dated Jul. 13, 2018.
Minor, Barbara, et al., "HFO-1234yf Low GWP Refrigerant Update," Honeywell / DuPont Joint Collaboration, European Automotive A/C Convention, Sep. 22-23, 2008, XP055208343, https://www.chemours.com/refrigerants/en_us/assts/downloads/smartautoac/mac_eaac_hfo_123yf.pdf, Retrieved from the Internet.
**Rached, Wissam, U.S. Appl. No. 16/339,903 entitled "Tetrafluoropropene-Based Azeotropic Compositions," filed in the U.S. Patent and Trademark Office dated Apr. 5, 2019.
**Rached, Wissam, U.S. Appl. No. 16/339,956 entitled "Use of Tetrafluoropropene Based Compositions", filed in the U.S. Patent and Trademark Office dated Apr. 5, 2019.
U.S. Appl. No. 16/339,956, Rached.
U.S. Appl. No. 16/339,903, Rached.
**Rached, Wissam, U.S. Appl. No. 16/395,413 entitled "Low-Temperature and Average-Temperature Refrigeration," filed in the U.S. Patent and Trademark Office dated Apr. 26, 2019.
**Rached, Wissam, U.S. Appl. No. 16/477,263 entitled "Composition Comprising 2,3,3,3-Tetrafluoropropane," filed in the U.S. Patent and Trademark Office dated Jul. 11, 2019.
**Rached, Wissam, U.S. Appl. No. 16/477,318 entitled "Composition Comprising 2,3,3,3-Tetrafluoropropane," filed in the U.S. Patent and Trademark Office dated Jul. 11, 2019.
**Rached, Wissam, et al., U.S. Appl. No. 16/514,241 entitled "Stabilization of 1-Chloro-3,3,3-Trifluoropropane," filed in the U.S. Patent and Trademark Office dated Jul. 17, 2019.
U.S. Appl. No. 16/395,413, Rached.
U.S. Appl. No. 16/477,263, Rached.
U.S. Appl. No. 16/477,318, Rached.
U.S. Appl. No. 16/514,241, Rached et al.
**Rached, Wissam, U.S. Appl. No. 16/142,492 entitled "Heat Transfer Fluid," filed in the U.S. Patent and Trademark Office dated Sep. 26, 2018.
**Rached, Wissam, U.S. Appl. No. 16/143,518 entitled "Binary Refrigerating Fluid," filed in the U.S. Patent and Trademark Office dated Sep. 27, 2018.
U.S. Appl. No. 16/142,492, Rached.
U.S. Appl. No. 16/143,518, Rached.
**Rached, Wissam, U.S. Appl. No. 16/962,143, entitled "Heat Transfer Compositions as Replacement for R-134A," filed in the U.S. Patent and Trademark Office dated Jul. 14, 2020.
U.S. Appl. No. 16/962,143, Rached.
U.S. Appl. No. 16/962,143, Wissam Rached, filed Jul. 14, 2020.

* cited by examiner

VEHICLE HEATING AND/OR AIR CONDITIONING METHOD

CROSS REFERENCE TO RELATED APPLICATIONS

The present application is a continuation of U.S. application Ser. No. 15/368,347, filed on Dec. 2, 2016, which is a continuation of U.S. application Ser. No. 13/127,144, filed on Jun. 3, 2011, which is a national stage of International Application No. PCT/FR2009/052075, filed on Oct. 28, 2009, which claims the benefit of French Application No. 08.57454, filed on Nov. 3, 2008. The entire contents of each of U.S. application Ser. No. 15/368,347, U.S. application Ser. No. 13/127,144, International Application No. PCT/FR2009/052075, and French Application No. 08.57454 are hereby incorporated herein by reference in their entirety.

TECHNICAL FIELD

The present invention relates to a device for heating and/or air conditioning the passenger compartment of an automobile.

BACKGROUND

In automobiles, the thermal engine has a circuit in which flows a heat transfer fluid which is used for cooling the engine and also for heating the passenger compartment. For this purpose, the circuit comprises, notably, a pump and an air heater which recovers the heat stored by the heat transfer fluid in order to heat the passenger compartment.

Additionally, an air conditioning system for cooling the passenger compartment comprises an evaporator, a compressor, a condenser, an expansion valve and a fluid, commonly known as a coolant which can change its state (between liquid and gas). The compressor, driven directly by the vehicle engine by means of a belt and pulley, compresses the coolant and sends it back under high pressure and at high temperature toward the condenser. The condenser is provided with forced ventilation, causing the condensation of the gas which arrives in the gaseous state at high pressure and temperature. The condenser liquefies the gas as a result of the reduction of the temperature of the air flowing through it. The evaporator is a heat exchanger which draws heat from the air which is to be blown into the passenger compartment. The expansion valve can be used to regulate the inflow of the gas into the loop by a modification of the passage cross section depending on the temperature and pressure at the evaporator. Thus the hot air from outside the vehicle is cooled as it flows through the evaporator.

The coolant which is commonly used in automobile air conditioning is 1,1,1,2-tetrafluoroethane (HFC-134a).

Document WO 2008/107623 describes an automobile energy management system comprising a reversible cooling loop through which a coolant flows, means for reversing the operating cycle of the cooling loop, which can move between a cooling mode position and a heat pump mode position, at least a first source for recovering energy from the coolant, and at least a second source for evaporating the coolant after the expansion of said fluid from the liquid to the two-phase state, the reversal means enabling coolant to flow from the first recovery source toward at least one evaporation source, when they are in a position identical to that corresponding to the heat pump mode.

However, when HFC-134a is used as the coolant in a system such as that described in WO 2008/107623, and when the outside temperature is approximately −15° C., a pressure drop starts to develop in the evaporator even before the compressor is started. This pressure drop, which leads to infiltration of air into the system, promotes corrosion phenomena and the degradation of the components such as the compressor, exchanger and expansion valve.

The object of the present invention is to prevent the air from penetrating into the evaporator of the cooling loop when the compressor is started, and/or to improve the efficiency of the cooling loop.

DETAILED DESCRIPTION

The present invention therefore proposes a heating and/or air conditioning method for a passenger compartment of an automobile, using a reversible cooling loop, in which a coolant flows, comprising a first heat exchanger, an expansion valve, a second heat exchanger, a compressor and means for reversing the direction of flow of the coolant, characterized in that the coolant comprises 2,3,3,3-tetrafluoropropene.

The means for reversing the direction of flow of the coolant in the cooling loop in order to reverse the operating cycle of the loop can be a four-way valve.

In addition to the 2,3,3,3-tetrafluoropropene, the coolant can comprise saturated or unsaturated hydrofluorocarbons.

Examples of saturated hydrofluorocarbons which may be mentioned are, notably, difluoromethane, difluoro-ethane, tetrafluoroethane and pentafluoroethane.

Examples of unsaturated hydrofluorocarbons which may be mentioned are, notably, 1,3,3,3-tetrafluoropropene, trifluoropropenes such as 3,3,3-trifluoropropene, and monochlorotrifluoropropenes such as 1-chloro,3,3,3-trifluoropropene and 2-chloro,3,3,3-trifluoropropene.

The following compositions may be suitable for use as coolants in the method according to the present invention:
   80% to 98% by weight of 2,3,3,3-tetrafluoropropene and 2% to 20% by weight of difluoromethane,
   40% to 95% by weight of 2,3,3,3-tetrafluoropropene and 5% to 60% by weight of 1,1,1,2-tetrafluoroethane,
   90% to 98% by weight of 2,3,3,3-tetrafluoropropene and 2% to 10% by weight of difluoroethane,
   90% to 98% by weight of 2,3,3,3-tetrafluoropropene and 2% to 10% by weight of pentafluoroethane.

The following compositions are especially suitable for use as coolants:
   90% to 98% by weight of 2,3,3,3-tetrafluoropropene and 2% to 10% by weight of difluoromethane,
   90% to 95% by weight of 2,3,3,3-tetrafluoropropene and 5% to 10% by weight of 1,1,1,2-tetrafluoroethane,
   95% to 98% by weight of 2,3,3,3-tetrafluoropropene and 2% to 5% by weight of difluoroethane, 95% to 98% by weight of 2,3,3,3-tetrafluoropropene and 2% to 5% by weight of pentafluoroethane.

A composition which essentially contains 2,3,3,3-tetrafluoropropene is particularly preferred.

The coolant can also comprise stabilizers of the 2,3,3,3-tetrafluoropropene. Examples of stabilizer which may be mentioned are, notably, nitromethane, ascorbic acid, terephthalic acid azoles such as tolytriazole or benzotriazole, phenolic compounds such as tocopherol, hydroquinone, t-butyl hydroquinone, 2,6-di-tert-butyl-4-methylphenol, epoxides (alkyl which may be fluorinated or perfluorinated or alkenyl or aromatic) such as n-butyl glycidyl ethers, hexanediol diglycidyl ethers, allyl glycidyl ether, butylphenyl glycidyl ethers, phosphites, phosphates, phosphonates, thiols and lactones.

Depending on the operating mode of the loop, which may be the cooling or heat pump mode, the first heat exchanger can act as an evaporator or as an energy recovery unit. The same is true of the second heat exchanger. In cooling mode, the second exchanger can be used for cooling the air flow which is to be blown into the passenger compartment of the automobile. In heat pump mode, the second exchanger can be used to heat the air flow intended for the passenger compartment of the automobile.

The first and second heat exchangers are of the air/coolant type.

In the method according to the present invention, the cooling loop can be thermally coupled through the heat exchangers to the entire cooling circuit. Thus the loop can comprise at least one heat exchanger through which the coolant and a heat transfer fluid flow simultaneously, the heat transfer fluid being, notably, the air or water of the thermal engine cooling circuit.

In a variant of the method, both the coolant and the exhaust gases from the thermal engine of the automobile flow through the first heat exchanger simultaneously; these fluids can communicate thermally by means of a heat transfer fluid circuit.

In the method according to the present invention, the cooling loop can include a branch having at least one heat exchanger communicating thermally with a flow of air which is to be admitted into the thermal engine of the automobile, or with exhaust gases emitted by the thermal engine of the automobile.

The method according to the present invention is particularly suitable when the outside temperature is below −15° C., or preferably below −20° C.

The method according to the present invention is equally suitable for hybrid automobiles designed to operate alternatively with a thermal engine and an electric motor. It can be used to provide the best management of the energy contributions according to the climatic conditions (hot or cold) for both the passenger compartment and the battery, and notably to supply heat or cold to the battery through a heat transfer fluid circuit.

The reversible cooling loop, in which the coolant containing 2,3,3,3-tetrafluoropropene flows, installed in automobiles is particularly suitable for the recovery of energy from the thermal engine and/or from the electrical battery, for use in heating the passenger compartment and for heating the thermal engine during a cold start phase. When this reversible cooling loop comprises a pump, it can operate in Rankine mode (that is to say, the compressor acts as a turbine) to exploit the thermal energy produced by the thermal engine and subsequently conveyed by the coolant, after heat transfer.

The invention also proposes a device comprising the cooling loop as described above.

Figure 1:
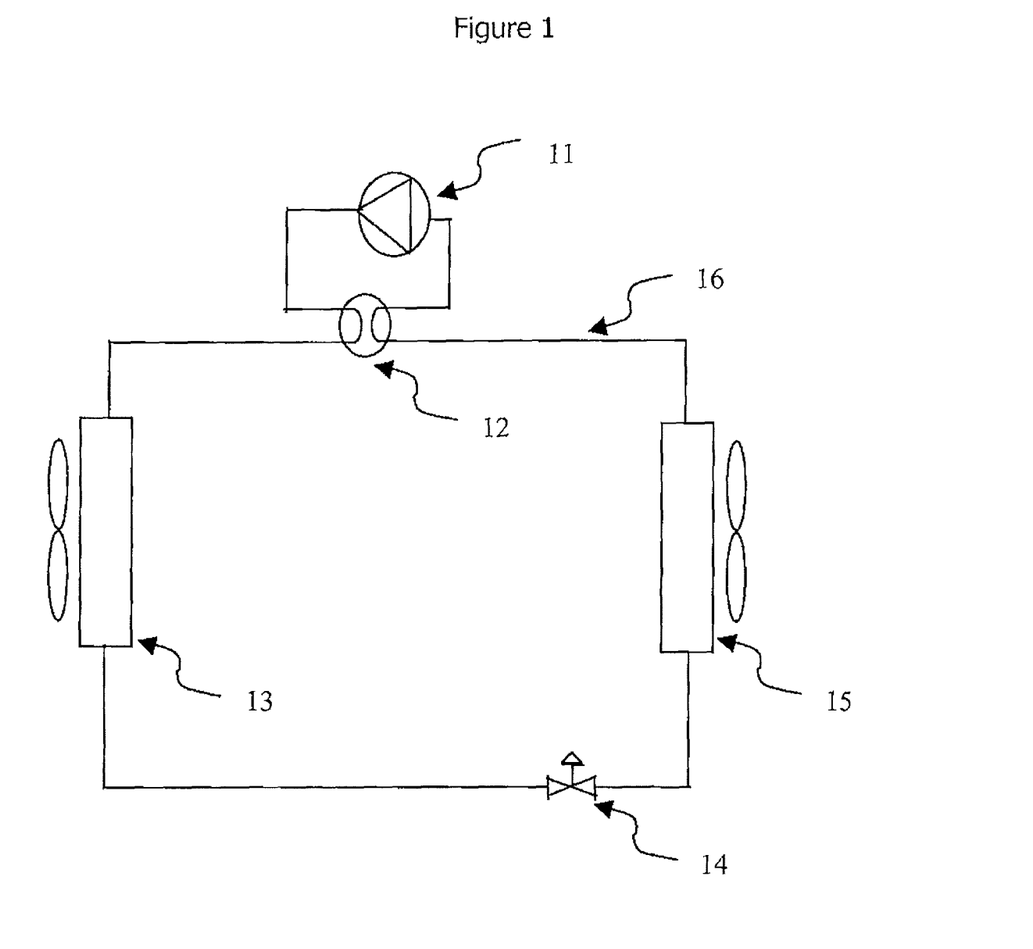
FIG. 1 is a schematic of a cooling loop in accordance with a first embodiment of the present invention.

In a first embodiment of the invention, illustrated schematically in FIG. 1, the cooling loop (16) comprises a first heat exchanger (13), an expansion valve (14), a second heat exchanger (15), a compressor (11) and a four-way valve (12). The first and second heat exchangers are of the air/coolant type. The coolant of the loop (16) and the air flow supplied by a fan pass through the first heat exchanger (13). Some or all of this air flow also passes through a heat exchanger of the engine cooling circuit (not shown in the drawing). In the same way, an air flow supplied by a fan passes through the second exchanger (15). Some or all of this air flow also passes through another heat exchanger of the engine cooling circuit (not shown in the drawing). The direction of flow of the air is a function of the operating mode of the loop (16) and of the requirements of the thermal engine. Thus, when the thermal engine is in stationary mode and the loop (16) is in heat pump mode, the air can be heated by the exchanger of the thermal engine cooling circuit, and can then be blown on to the exchanger (13) to accelerate the evaporation of the fluid of the loop (16) and thereby improve the performance of this loop.

The exchangers of the cooling circuit can be activated by means of valves according to the requirements of the thermal engine (for heating the air entering the engine or for exploiting the energy produced by this engine).

In cooling mode, the coolant propelled by the compressor (11) flows through the valve (12) and then through the exchanger (13) which acts as a condenser (that is to say, it releases heat to the outside), and subsequently through the expansion valve (14) and then through the exchanger (15) which acts as an evaporator for cooling the air flow which is to be blown into the passenger compartment of the automobile.

In heat pump mode, the direction of flow of the coolant is reversed by means of the valve (12). The heat exchanger (15) acts as a condenser, while the exchanger (13) acts as an evaporator. The heat exchanger (15) can then be used to heat the air flow intended for the passenger compartment of the automobile.

Figure 2:
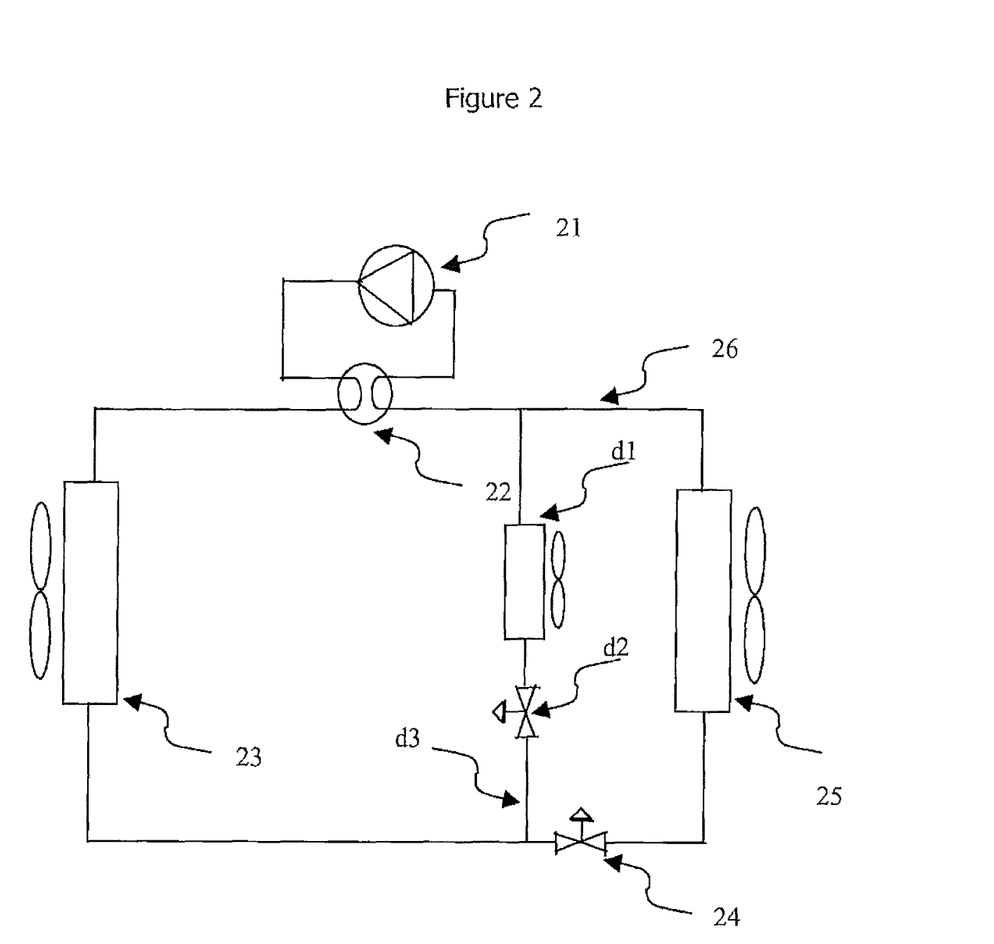
FIG. 2 is a schematic of a cooling loop in accordance with a second embodiment of the present invention.

In a second embodiment of the invention, shown schematically in FIG. 2, the cooling loop (26) comprises a first heat exchanger (23), an expansion valve (24), a second heat exchanger (25), a compressor (21), a four-way valve (22) and a branch (d3) connected at one end to the outlet of the exchanger (23) and at the other end to the outlet of the exchanger (25), with respect to the flow of the fluid in cooling mode. This branch comprises a heat exchanger (d1), through which an air flow or a flow of exhaust gas to be admitted into the thermal engine passes, and an expansion valve (d2). The first and second heat exchangers (23 and 25) are of the air/coolant type. The coolant of the loop (26) and the air flow supplied by a fan pass through the first heat exchanger (23). Some or all of this air flow also passes through a heat exchanger of the engine cooling circuit (not shown in the drawing). In the same way, an air flow supplied by a fan passes through the second exchanger (25). Some or all of this air flow also passes through another heat exchanger of the engine cooling circuit (not shown in the drawing). The direction of flow of the air is a function of the operating mode of the loop (26) and of the requirements of the thermal engine. By way of example, when the thermal engine is in stationary mode and the loop (26) is in heat pump mode, the air can be heated by the exchanger of the thermal engine cooling circuit, and can then be blown on to the exchanger (23) to accelerate the evaporation of the fluid of the loop (26) and thereby improve the performance of this loop.

The exchangers of the cooling circuit can be activated by means of valves according to the requirements of the thermal engine (for heating the air entering the engine or for exploiting the energy produced by this engine).

The heat exchanger (d1) can also be activated according to the energy requirements in either cooling or heat pump mode. Check valves can be fitted in the branch (d3) to activate or disable this branch.

A flow of air supplied by a fan passes through the exchanger (d1). The same air flow can pass through another heat exchanger of the engine cooling circuit and also through other exchangers placed in the exhaust gas circuit, on the air intake of the engine, or on the battery in a hybrid automobile.

Figure 3:
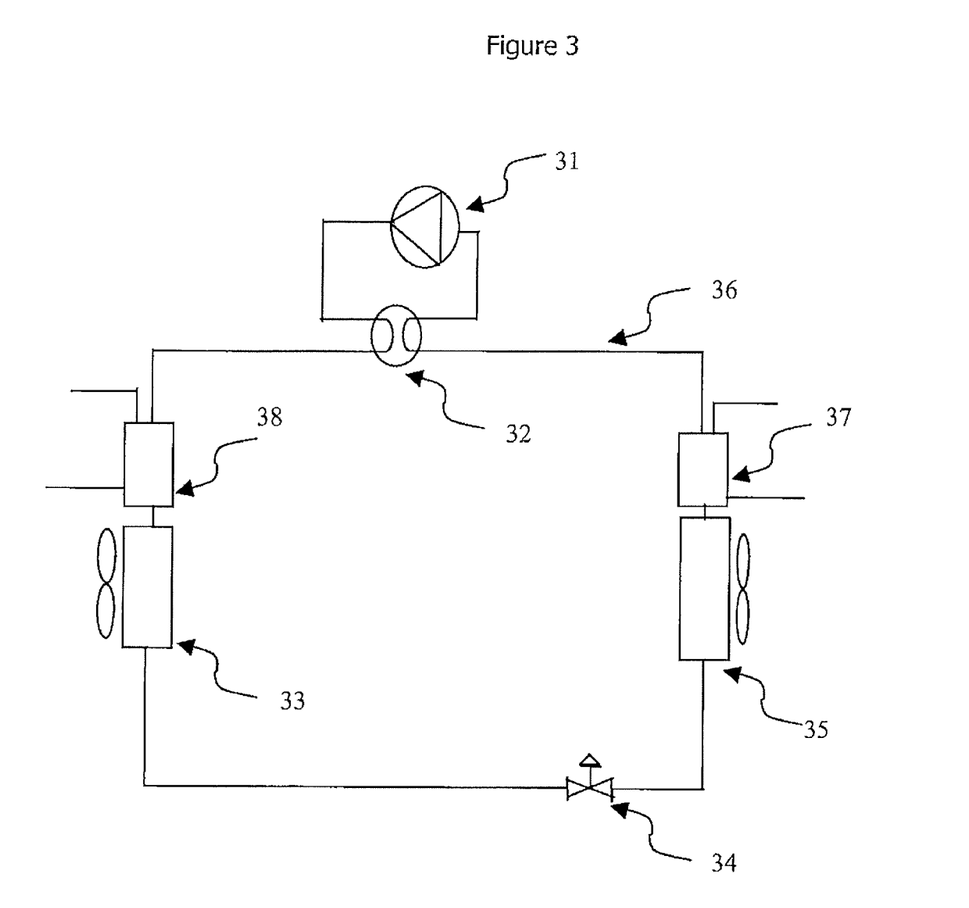
FIG. 3 is a schematic of a cooling loop in accordance with a third embodiment of the present invention.

In a third embodiment of the invention, illustrated schematically in FIG. 3, the cooling loop (36) comprises a first heat exchanger (33), an expansion valve (34), a second heat exchanger (35), a compressor (31) and a four-way valve (32). The first and second heat exchangers (33 and 35) are of the air/coolant type. The operation of the exchangers (33 and 35) is identical to that of the first embodiment shown in FIG. 1. Two fluid/liquid exchangers (38 and 37) are fitted both in the cooling loop circuit (36) and in the thermal engine cooling circuit or in a secondary glycol-water circuit. The fitting of the fluid/liquid exchangers without the use of an intermediate gaseous fluid (air) flowing through them contributes to an improvement of the heat exchange with respect to air/fluid exchangers.

Figure 4:
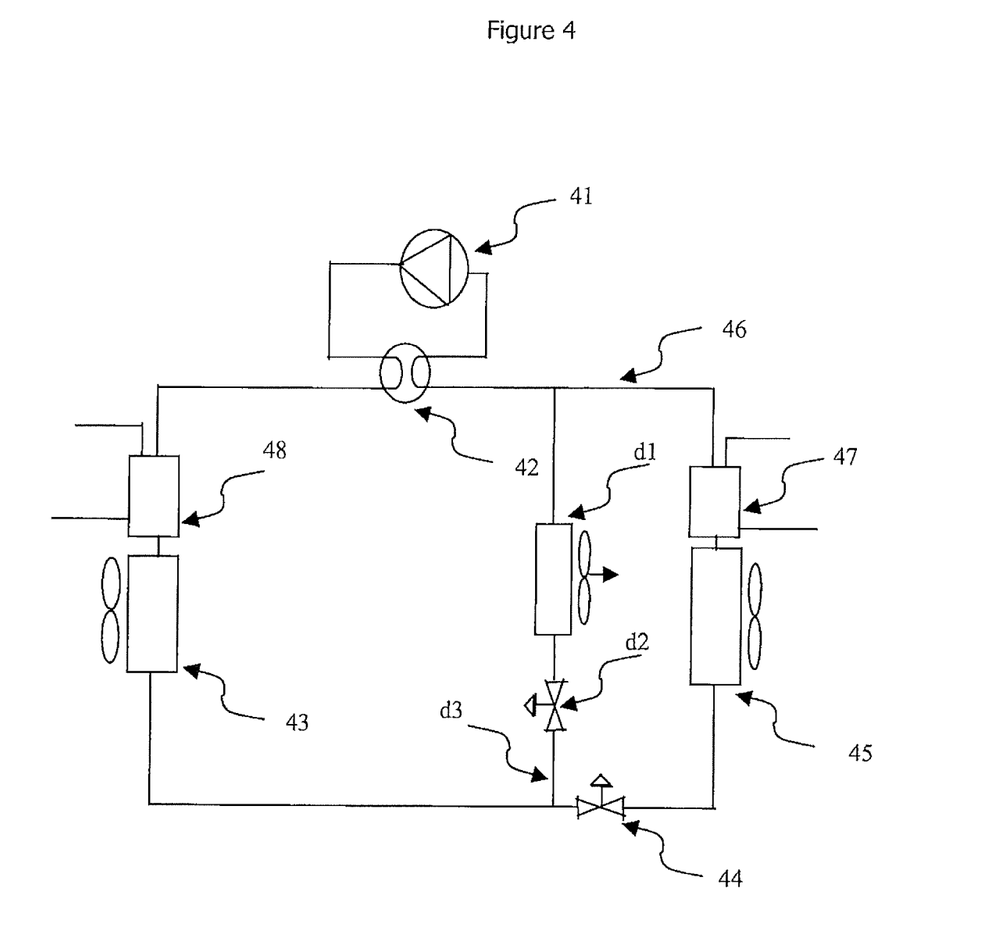
FIG. 4 is a schematic of a cooling loop in accordance with a fourth embodiment of the present invention.

In a fourth embodiment of the invention, illustrated schematically in FIG. 4, the cooling loop (46) comprises a first heat exchanger set (43 and 48), an expansion valve (44), a second heat exchanger set (45 and 47), a compressor (41) and a four-way valve (42). A branch (d1) having one end connected to the outlet of the exchanger (43) and the other end connected to the outlet of the exchanger (47), with respect to the flow of the fluid in cooling mode. This branch comprises a heat exchanger (d1), through which an air flow or a flow of exhaust gas to be admitted into the thermal engine passes, and an expansion valve (d2). The operation of this branch is identical to that of the second embodiment shown in FIG. 2.

Figure 6:
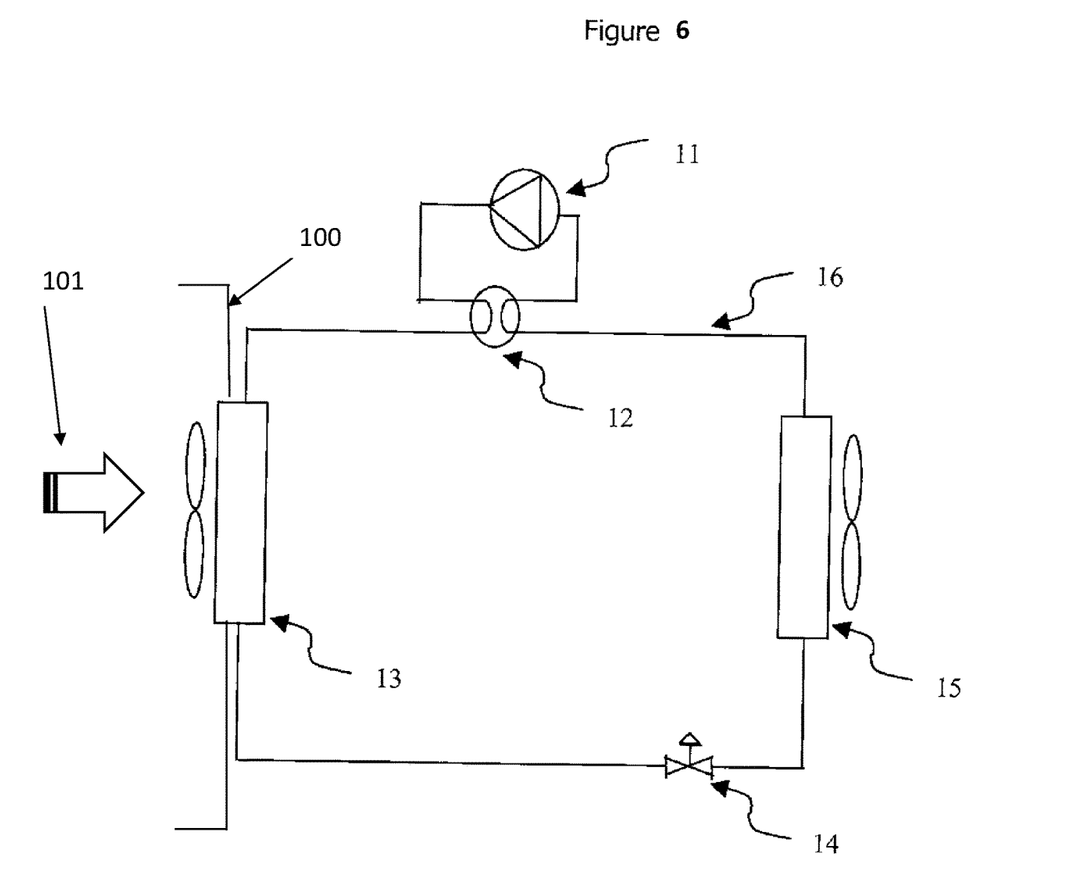
FIG. 6 is a schematic of a cooling loop in accordance with an embodiment of the present invention.

FIG. 6 is a schematic of a cooling loop showing exhaust gases (101) and a coolant (100) from a thermal engine.

The heat exchangers (43 and 45) are of the air/coolant type and the exchangers (48 and 47) are of the liquid/coolant type. The operation of these exchangers is identical to that of the third embodiment shown in FIG. 3.

Experimental Section

Simulations of the performance of the coolant in the heat pump operating conditions in vehicles are given below, for a condenser temperature of 30° C. Condensation temperature: +30° C. (T cond)

Temperature at the compressor inlet: +5° C. (Te comp)

Evap P is the pressure at the evaporator.

Cond P is the pressure at the condenser.

T outlet comp is the temperature at the compressor outlet.

Rate: the compression rate is the ratio of the high pressure to the low pressure.

COP: this is the coefficient of performance and is defined, in the case of a heat pump, as the useful thermal power supplied by the system divided by the power received or consumed by the system.

CAP: this is the cubic capacity, which is the heating capacity per unit of volume ($kJ/m^3$).

% CAP or COP is the ratio of the value of the CAP or COP of 2,3,3,3-tetrafluoropropene (HFO-1234yf) to that of HFC-134a.

Isentropic efficiency of the compressor: this is the ratio between the real energy transmitted to the fluid and the isentropic energy.

Figure 5:
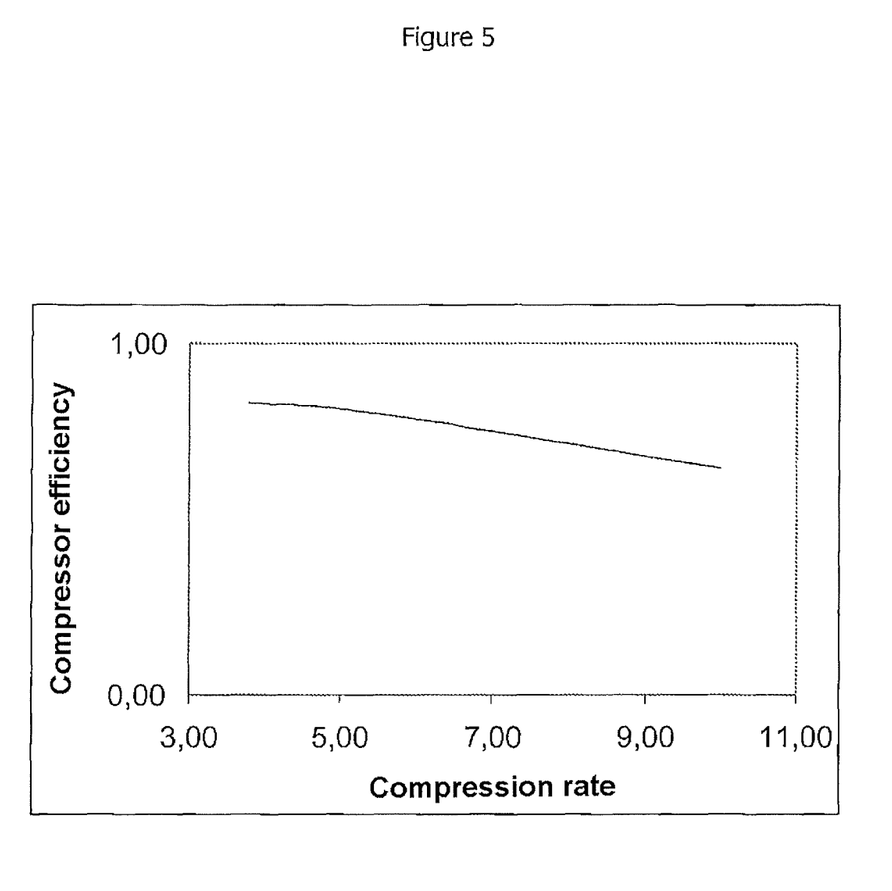
FIG. 5 is a graph of compressor efficiency versus compression rate showing isentropic efficiency.

The isentropic efficiency of the compressor is expressed as a function of the compression rate. (FIG. 5)

$$\eta = a + b\tau + c\cdot\tau^2 + d\cdot\tau^3 + e\cdot\tau^4$$

$\eta$: isentropic efficiency $\tau$: compression rate a, b, c and e: constants

The values of the constants a, b, c, d and e are determined from a standard efficiency curve, found in "Handbook of air conditioning and refrigeration", by Shan K. Wang.

For HFC-134a, the COP and the pressure at the evaporator decrease with the evaporation temperature.

|  | Temp evap (° C.) | evap P (kPa) | cond P (kPa) | Rate (p/p) | T outlet comp | CAP ($kJ/m^3$) | Isentrop. eff. | COPc |
|---|---|---|---|---|---|---|---|---|
| HFC-134a | −35.00 | 66.70 | 768.33 | 11.52 | 82.61 | 679.70 | 0.62 | 2.32 |
|  | −30.00 | 84.92 | 768.33 | 9.05 | 75.31 | 841.71 | 0.68 | 2.82 |
|  | −25.00 | 106.89 | 768.33 | 7.19 | 68.35 | 1032.37 | 0.75 | 3.39 |
|  | −20.00 | 133.14 | 768.33 | 5.77 | 61.72 | 1255.21 | 0.79 | 4.01 |

For HFO-1234yf in the same conditions, we find:

|  | Temp evap (° C.) | evap P (kPa) | cond P (kPa) | Rate (P/P) | T outlet comp | CAP ($kJ/m^3$) | Isentrop. eff. | COPc | % cap | % COP |
|---|---|---|---|---|---|---|---|---|---|---|
| HFO-1234yf | −35.00 | 77.05 | 772.09 | 10.02 | 70.15 | 707.00 | 0.66 | 2.43 | 104 | 104 |
|  | −30.00 | 97.01 | 772.09 | 7.96 | 64.10 | 865.60 | 0.72 | 2.91 | 103 | 103 |
|  | −25.00 | 120.73 | 772.09 | 6.40 | 58.36 | 1049.51 | 0.77 | 3.45 | 102 | 102 |
|  | −20.00 | 148.64 | 772.09 | 5.19 | 52.88 | 1261.40 | 0.81 | 4.01 | 100 | 100 |

The evaporator pressure with HFO-1234yf is higher than with HFC-134a, thus helping to limit the infiltration of air into the system when the system operates at a very low temperature.

For a given compressor operating at very low temperature, the performance of HFO-1234yf is better than that of HFC-134a. In heating mode and when the condensation temperature is 30° C., the use of HFO-1234yf yields better efficiency at the compressor, better COP and better capacity.

Embodiments

1. A heating and/or air conditioning method for a passenger compartment of an automobile, using a reversible cooling loop, in which a coolant flows, comprising a first heat exchanger, an expansion valve, a second heat exchanger, a compressor and means for reversing the direction of flow of the coolant, characterized in that the coolant comprises 2,3,3,3-tetrafluoropropene.

2. The method as in embodiment 1, characterized in that the coolant can comprise saturated and unsaturated hydrofluorocarbons.

3. The method as in embodiments 1 or 2, characterized in that the first and second exchangers are of the air/coolant type.

4. The method as in any one of embodiments 1 to 3, characterized in that the cooling loop is thermally coupled to the cooling circuit of the thermal engine.

5. The method as in any one of embodiments 1 to 4, characterized in that both the coolant and the exhaust gases from the thermal engine of the automobile flow through the first heat exchanger simultaneously.

6. The method as in any one of embodiments 1 to 5, characterized in that the cooling loop can include a branch having at least one heat exchanger communicating thermally with a flow of air which is to be admitted into the thermal engine of the automobile, or with exhaust gases emitted by the thermal engine of the automobile.

7. The method as in any one of embodiments 1 to 6, characterized in that the cooling loop is installed in vehicles for recovering energy from the thermal engine and/or from the electrical battery.

8. A device comprising the reversible cooling loop as claimed in any one of the preceding embodiments.

The invention claimed is:

1. A heating and/or air conditioning method for a passenger compartment of an automobile, the method comprising:
   operating a reversible cooling loop, in which a coolant flows, said reversible cooling loop comprising a first heat exchanger, an expansion valve, a second heat exchanger, a compressor and
   reversing the operating cycle of said reversible cooling loop, wherein the coolant comprises 2,3,3,3-tetrafluoropropene,
   wherein the automobile contains an electrical battery, wherein the reversible cooling loop recovers energy from the electrical battery,
   wherein the automobile comprises a thermal engine with a cooling circuit through which an engine coolant flows, wherein the reversible cooling loop is thermally coupled to the cooling circuit of the thermal engine, and
   wherein the reversible cooling loop further comprises a branch having at least one heat exchanger communicating thermally with a flow of air which is to be admitted into the thermal engine of the automobile, or with exhaust gases emitted by the thermal engine of the automobile.

2. The method as claimed in claim 1, wherein the coolant comprises saturated and unsaturated hydrofluorocarbons.

3. The method as claimed in claim 1, wherein the first heat exchanger and second heat exchanger are of the air/coolant type.

4. The method as claimed in claim 1, wherein the reversible cooling loop recovers energy from the thermal engine.

5. The method as claimed in claim 1, wherein the reversible cooling loop recovers energy from the battery and delivers energy to the battery.

6. The method as claimed in claim 1, wherein the coolant comprises 2,3,3,3-tetrafluoropropene and difluoromethane.

7. The method as claimed in claim 1, wherein the coolant comprises from about 60 wt. % to about 80 wt. % 2,3,3,3-tetrafluoropropene and from about 20 wt. % to about 40 wt. % difluoromethane.

8. The method as claimed in claim 1, wherein the reversible cooling loop recovers energy from the battery and delivers energy to the battery.

9. The method as claimed in claim 1, wherein the cooling circuit of the thermal engine comprises a heat exchanger, wherein air is heated by the heat exchanger of the cooling circuit of the thermal engine and then is blown onto the first heat exchanger of the reversible cooling loop.

10. The method as claimed in claim 1, wherein a fluid/liquid heat exchanger is in both the reversible cooling loop and in the thermal engine cooling circuit.

11. A heating and/or air conditioning method for a passenger compartment of an automobile, the method comprising:
   operating a reversible cooling loop, in which a coolant flows, said reversible cooling loop comprising a first heat exchanger, an expansion valve, a second heat exchanger, a compressor and
   reversing the operating cycle of said reversible cooling loop, wherein the coolant comprises 2,3,3,3-tetrafluoropropene, and
   wherein the automobile contains an electrical battery, wherein the reversible cooling loop recovers energy from the electrical battery,
   wherein the automobile comprises a thermal engine with a cooling circuit through which an engine coolant flows, wherein the reversible cooling loop is thermally coupled to the cooling circuit of the thermal engine,
   wherein both the coolant and exhaust gases from the thermal engine of the automobile flow through the first heat exchanger simultaneously.

12. A heating and/or air conditioning method for a passenger compartment of an automobile having a thermal engine with a cooling circuit through which an engine coolant flows and an electrical battery, the method comprising flowing a coolant through a reversible cooling loop comprising a first heat exchanger, an expansion valve, a second heat exchanger, a compressor and means for reversing the operating cycle of said reversible cooling loop, wherein the coolant comprises 2,3,3,3-tetrafluoropropene,
   wherein the reversible cooling loop recovers energy from the electrical battery,
   wherein the reversible cooling loop is thermally coupled to the cooling circuit of the thermal engine, and
   wherein the reversible cooling loop further comprises a branch having at least one heat exchanger communicating thermally with a flow of air which is to be admitted into the thermal engine of the automobile, or with exhaust gases emitted by the thermal engine of the automobile.

13. The method as claimed in claim 12, wherein the first and second exchangers are of the air/coolant type.

14. The method as claimed claim 12, wherein the reversible cooling loop recovers energy from the thermal engine.

15. The method as claimed in claim 12, wherein the automobile comprises the thermal engine with a cooling circuit through which an engine coolant flows, wherein the reversible cooling loop is thermally coupled to the cooling circuit of the thermal engine.

16. The method as claimed in claim 15, wherein the reversible cooling loop recovers energy from the thermal engine.

17. The method as claimed in claim 12, wherein the reversible cooling loop recovers energy from the battery and delivers energy to the battery.

18. The method as claimed in claim 12, wherein the coolant comprises 2,3,3,3-tetrafluoropropene and difluoromethane.

19. The method as claimed in claim 12, wherein the coolant comprises from about 60 wt. % to about 80 wt. % 2,3,3,3-tetrafluoropropene and from about 20 wt. % to about 40 wt. % difluoromethane.

20. The method as claimed in claim 12, wherein the reversible cooling loop recovers energy from the battery and delivers energy to the battery.

21. The method as claimed in claim 12, wherein the cooling circuit of the thermal engine comprises a heat exchanger, wherein air is heated by the heat exchanger of the cooling circuit of the thermal engine and then is blown onto the first heat exchanger of the reversible cooling loop.

22. The method as claimed in claim 12, wherein a fluid/liquid heat exchanger is in both the reversible cooling loop and in the thermal engine cooling circuit.

23. A heating and/or air conditioning method for a passenger compartment of an automobile having a thermal engine with a cooling circuit through which an engine coolant flows and/or an electrical battery, the method comprising flowing a coolant through a reversible cooling loop comprising a first heat exchanger, an expansion valve, a second heat exchanger, a compressor and means for reversing the operating cycle of said reversible cooling loop, wherein the coolant comprises 2,3,3,3-tetrafluoropropene, and
 wherein the automobile contains the electrical battery,
  wherein the reversible cooling loop recovers energy from the electrical battery,
 wherein the coolant and exhaust gases from the thermal engine of the automobile flow through the first heat exchanger simultaneously.

\* \* \* \* \*